United States Patent
Hamada (10) Patent No.: US 8,938,132 B2
(45) Date of Patent: Jan. 20, 2015

(54) IMAGE COLLATION SYSTEM, IMAGE COLLATION METHOD AND COMPUTER PROGRAM

(75) Inventor: Yasushi Hamada, Tokyo (JP)

(73) Assignee: NEC Corporation, Tokyo (JP)

(\*) Notice: Subject to any disclaimer, the term of this patent is extended or adjusted under 35 U.S.C. 154(b) by 253 days.

(21) Appl. No.: 13/521,436

(22) PCT Filed: Dec. 14, 2010

(86) PCT No.: PCT/JP2010/072492
§ 371 (c)(1),
(2), (4) Date: Jul. 10, 2012

(87) PCT Pub. No.: WO2011/086803
PCT Pub. Date: Jul. 21, 2011

(65) Prior Publication Data
US 2012/0314904 A1 Dec. 13, 2012

(30) Foreign Application Priority Data
Jan. 12, 2010 (JP) .................. 2010-003832

(51) Int. Cl.
*G06K 9/32* (2006.01)
*G06K 9/00* (2006.01)
*G06T 7/00* (2006.01)

(52) U.S. Cl.
CPC ........ *G06K 9/00208* (2013.01); *G06K 9/00221* (2013.01); *G06T 7/0042* (2013.01); *G06T 2207/30201* (2013.01)
USPC ............................. 382/294; 708/422; 345/630

(58) Field of Classification Search
USPC ......... 382/100, 103, 108, 115, 116, 117, 118, 382/154, 181, 190, 195, 201, 203, 276, 278, 382/289, 294, 296; 708/422; 345/619–689
See application file for complete search history.

(56) References Cited

U.S. PATENT DOCUMENTS 7,593,551 B2 \* 9/2009 Kamei .......................... 382/118
7,636,456 B2 \* 12/2009 Collins et al. ................. 382/118
(Continued)

FOREIGN PATENT DOCUMENTS

CN  101377814 (A)  3/2009
CN  101436250 (A)  5/2009
(Continued)

OTHER PUBLICATIONS

International Search Report in PCT/JP2010/072492 dated Jan. 18, 2011(English Translation Thereof).
(Continued)

*Primary Examiner* — Anand Bhatnagar
(74) *Attorney, Agent, or Firm* — McGinn IP Law Group, PLLC (57) ABSTRACT

An image collation system includes: a first direction estimating unit for estimating a first imaging direction of a reference object that matches an imaging direction of a collation target object by comparing global characteristics between an image of the collation target object and the three-dimensional data of the reference object; a second direction estimating unit for generating an image corresponding to the first imaging direction of the reference object, and estimating a second imaging direction of the reference object that matches the imaging direction of the collation target object by comparing local characteristics between the image of the collation target object and the generated image corresponding to the first imaging direction; and an image conformity determining unit for generating an image corresponding to the second imaging direction of the reference object, and determining whether the image of the collation target object matches the generated image corresponding to the second imaging direction.

12 Claims, 5 Drawing Sheets

(56) References Cited

U.S. PATENT DOCUMENTS

| | | | |
|---|---|---|---|
| 7,925,060 B2* | 4/2011 | Norita et al. | 382/118 |
| 8,253,778 B2* | 8/2012 | Atsushi | 348/42 |
| 8,331,616 B2 | 12/2012 | Sabe et al. | |
| 2001/0031073 A1* | 10/2001 | Tajima | 382/118 |
| 2002/0097906 A1 | 7/2002 | Ishiyama | |
| 2006/0228005 A1* | 10/2006 | Matsugu et al. | 382/116 |
| 2007/0047775 A1 | 3/2007 | Okubo | |
| 2008/0075359 A1 | 3/2008 | Ishiyama | |
| 2008/0080763 A1* | 4/2008 | Ishiyama | 382/154 |
| 2008/0094393 A1 | 4/2008 | Ishiyama | |
| 2008/0273745 A1* | 11/2008 | Bazin | 382/100 |
| 2009/0060290 A1 | 3/2009 | Sabe et al. | |
| 2012/0082383 A1* | 4/2012 | Kruglick | 382/195 |
| 2012/0288148 A1* | 11/2012 | Suzuki et al. | 382/103 |
| 2013/0071031 A1* | 3/2013 | Huang et al. | 382/190 |

FOREIGN PATENT DOCUMENTS

| | | |
|---|---|---|
| CN | 101571919 (A) | 11/2009 |
| CN | 101582163 (A) | 11/2009 |
| JP | 2007-065766 A | 3/2007 |
| JP | 4167390 B2 | 10/2008 |

OTHER PUBLICATIONS

Yasushi Hamada et al., "Facial image matching using corresponding feature points on detailed textures", Technical Report of IEICE, vol. 108, No. 198, PRMU 2008-75, pp. 175-180, Sep. 2008.

Chinese Office Action dated Apr. 17, 2014, with English translation.

* cited by examiner

IMAGE COLLATION SYSTEM, IMAGE COLLATION METHOD AND COMPUTER PROGRAM

BACKGROUND

The present invention relates to an image collation technology.

As a face image collation technique, a collation technique using an image of a face not looking straight ahead is available. This collating technique using an image of a face not looking straight ahead is very convenient, since it is unnecessary to force the target individual to turn their face toward an imaging device.

As an example of a face image collation technique, the following Patent Document 1 discloses that the positions of characteristic areas or points (characteristic points), such as eyes and mouth, of which brightness values change considerably on an image of an object, are detected from an image of a registered object and an input image of a target object respectively, and an image of which positions of the characteristic points are most similar with the input image is determined, whereby a position, posture or the like of the target object is calculated.

The following Non-patent Document 1 discloses that combinations of corresponding points between two images are determined, out of minor characteristics, such as moles, wrinkles, freckles and tiny bumps on the face, as the corresponding characteristic points, and a collation score of the two images is calculated based on the similarity and position of each of the corresponding characteristic points.

[Patent Document 1] Japanese Patent Document No. 4167390

[Non-patent Document 1] "Face image matching using corresponding feature points on detailed textures", Technical Report of IEICE, Vol. 108, No. 198, PRMU 2008-75, pp. 175-180. September 2008, Yasushi Hamada, Hitoshi Imaoka According to the technique disclosed in Patent Document 1, however, a part of the characteristic points existing on the front area of a face (e.g. eyes, mouth) cannot be detected if the target individual is looking aside, and therefore collation accuracy with a reference image drops.

In the case of the technique disclosed in Non-patent Document 1, if the imaging direction of a collation target object is quite different from the imaging direction of a reference object, corresponding characteristic points cannot be detected, or enormous processing is required to detect corresponding characteristic points.

SUMMARY

It is an exemplary object of the present invention to provide a new framework for image collation.

An image collation system of the present invention comprises: three-dimensional data storing means for storing three-dimensional data on at least a shape and a texture of a reference object; first direction estimating means for estimating a first imaging direction of the reference object that matches an imaging direction of a collation target object by comparing global characteristics between an image of the collation target object and the three-dimensional data of the reference object stored in the three-dimensional data storing means; second direction estimating means for generating an image corresponding to the first imaging direction of the reference object based on the three-dimensional data, and estimating a second imaging direction of the reference object that matches the imaging direction of the collation target object by comparing local characteristics between the image of the collation target object and the generated image corresponding to the first imaging direction; and image conformity determining means for generating an image corresponding to the second imaging direction of the reference object based on the three-dimensional data, and determining whether the collation target object corresponds to the reference object based on whether the image of the collation target object matches the generated image corresponding to the second imaging direction.

According to an exemplary aspect of the present invention, the second direction estimating means may extract corresponding partial areas in the image of the collation target object and the image corresponding to the first imaging direction of the reference object, and determines the second imaging direction of the reference object so that the extracted corresponding partial areas overlap with each other.

According to another exemplary aspect of the present invention, the second direction estimating means may change the imaging direction for each partial area of an image corresponding to the first imaging direction of the reference object, so that the partial area becomes most similar to each partial area of the image of the collation target object, and determines the partial area of the image of the collation target object of which similarity is highest, as the corresponding partial area.

According to another exemplary aspect of the present invention, the image conformity determining means may determine whether the image corresponding to the second imaging direction of the reference object matches the image of the collation target object, based on the result of comparing the global characteristics and local characteristics respectively between these images.

According to another exemplary aspect of the present invention, the collation target object and the reference object are human faces, and the local characteristics are image characteristics based on at lease one of: moles, spots, freckles, pores and bumps on the skin of the face.

An image collation method of the present invention comprises: a first direction estimating step of estimating a first imaging direction of a reference object that matches an imaging direction of a collation target object by comparing global characteristics between an image of the collation target object and three-dimensional data on at least a shape and a texture of the reference object stored in three-dimensional data storing means; a second direction estimating step of generating an image corresponding to the first imaging direction of the reference object based on the three-dimensional data and estimating a second imaging direction of the reference object that matches the imaging direction of the collation target object by comparing local characteristics between the image of the collation target object and the generated image corresponding to the first imaging direction; and an image conformity determining step of generating an image corresponding to the second imaging direction of the reference object based on the three-dimensional data, and determining whether the collation target object corresponds to the reference object based on whether the image of the collation target object matches the generated image corresponding to the second imaging direction.

A computer program of the present invention is a computer program for causing a computer to execute the above mentioned image collation method.

In the present invention, "means" does not simply refer to a physical means, but includes a case of software implementing a function of a means. A function of one means or of one device may be implemented by two or more physical means or devices, or functions of two or more means or devices may be implemented by one physical means or device.

According to the present invention, the imaging direction estimation processing is used in steps, that is a general imaging direction (first imaging direction) of the reference object is estimated based on the global characteristics first, then a more detailed imaging direction (second imaging direction) of the reference object is estimated based on the local characteristics, thereby the imaging direction of the reference object can be estimated at high accuracy. The detailed imaging direction (second imaging direction) of the reference object can be estimated based on the previously estimated general imaging direction (first imaging direction), hence processing efficiency can be dramatically improved.

EXEMPLARY EMBODIMENT

As an exemplary embodiment of the present invention, a framework for determining whether a human face, which is a collation target object, matches a face stored in advance as a reference object, will be described with reference to the drawings.

Figure 1:
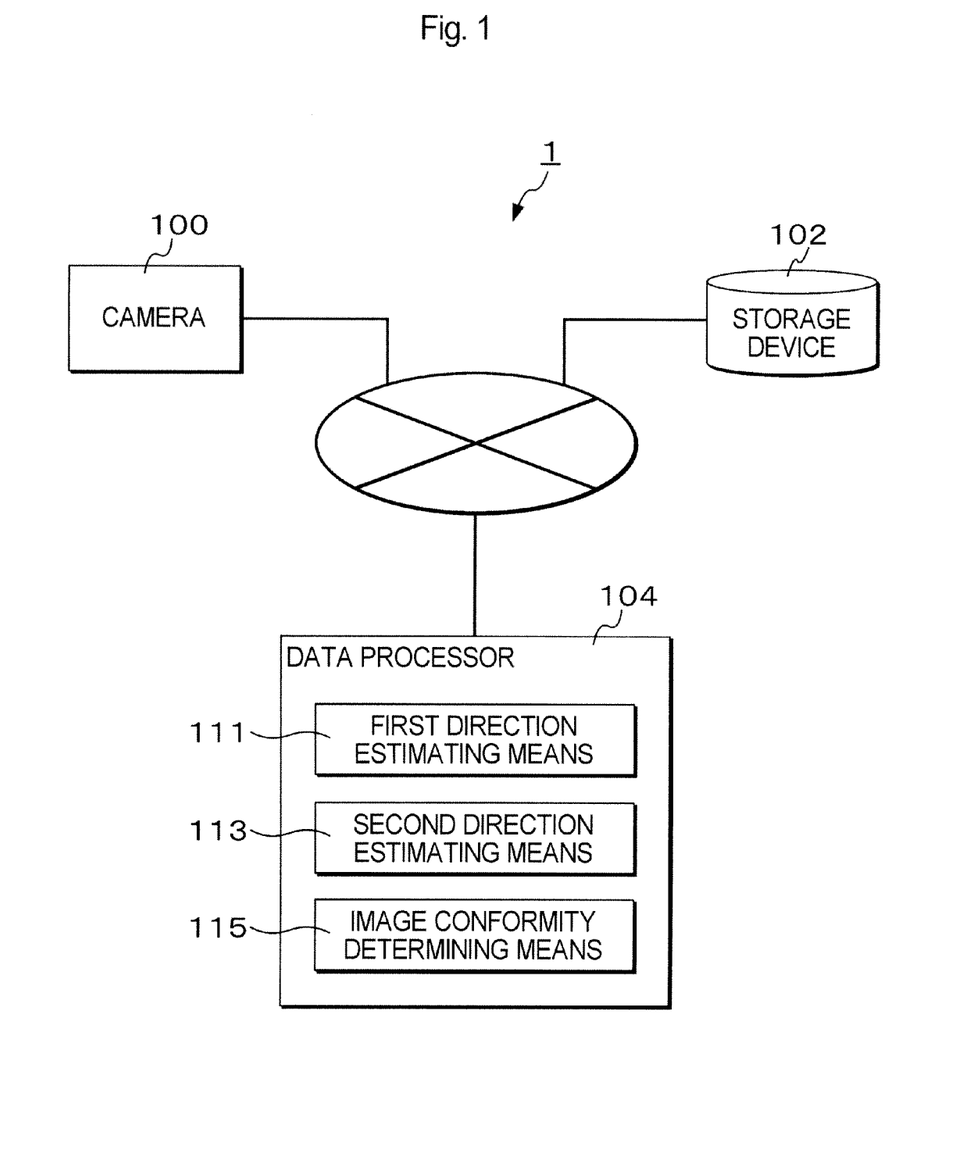
FIG. 1 is a diagram depicting a general configuration of an image collation system of a first embodiment.

FIG. 1 illustrates a general configuration of an image collation system 1 of a first embodiment.

The image collation system 1 includes a camera 100, a storage device 102 and a data processor 104 which are communicably configured via a communication line. For the communication line, such known technologies as LAN, WAN, Bluetooth™ and USB can be used alone or in combination.

The camera 100 has a function to capture an image of a human face as a collation target object, and output the image data.

The storage device 102 is a means of storing three-dimensional data on a human face as a reference object. For the three-dimensional data on a human face, it is possible to store at least data on a three-dimensional shape of a face and a texture pattern of a surface of a face. In this embodiment, the storage device 102 is described as an external device of the data processor 104, but may be embedded in the data processor 104.

The data processor 104 can be constructed using a standard computer, and includes first direction estimating means 111, second direction estimating means 113 and image conformity determining means 115 as means that are functionally implemented by a CPU reading out computer programs stored on a hard disk, using RAM and executing programs.

The first direction estimating means 111 compares global characteristics between the image of the collation target object and three-dimensional data of the reference object stored in the storage device 102, whereby the first imaging direction of the reference object that matches the imaging direction of the collation object is estimated. In this invention, the global characteristics are relatively major image characteristics which can be detected when an image of the collation target object and that of the reference object are globally observed respectively. In this embodiment, the image characteristics of such areas as eyes, eyebrows, mouth and nose are used for the global characteristics. These areas can be easily detected because the number of these areas and the general locations thereof on the surface of a face are predetermined. The global characteristics of a face image may be difficult to be detected, depending on the imaging direction, that is, for example, it is difficult to detect the image characteristics of the left eye if the face is imaged from the right side thereof.

The second direction estimating means 113 generates an image corresponding to the first imaging direction of the reference object (image of the reference object viewed from this imaging direction) based on the three-dimensional data stored in the storage device 102, and compares local characteristics between the image of the collation target object and the generated image corresponding to the first imaging direction, whereby the second imaging direction of the reference object, that matches the imaging direction of the collation target object, is estimated.

In this invention, the local characteristics are relatively minor image characteristics which can be detected when an image of the collation target object and that of the reference object are locally observed respectively. In this embodiment, image characteristics representing small patterns on the skin surface, such areas as moles, wrinkles, freckles, pores and bumps on the skin are used. These characteristics exist throughout the surface of the face in irregular numbers and locations. The local characteristics of the face image can always be detected, regardless of the imaging directions of the collation target object and reference object, but the forms thereof easily change depending on the imaging direction.

The image conformity determining means 115 generates an image corresponding to the second imaging direction of the reference object based on the three-dimensional data stored in the storage device 102, compares the global characteristics and local characteristics respectively between the generated image and the image of the collation target object, determines whether these images match based on the respective comparison results, and determines whether the collation target object corresponds to the reference object based on the above determination result.

Figure 2:
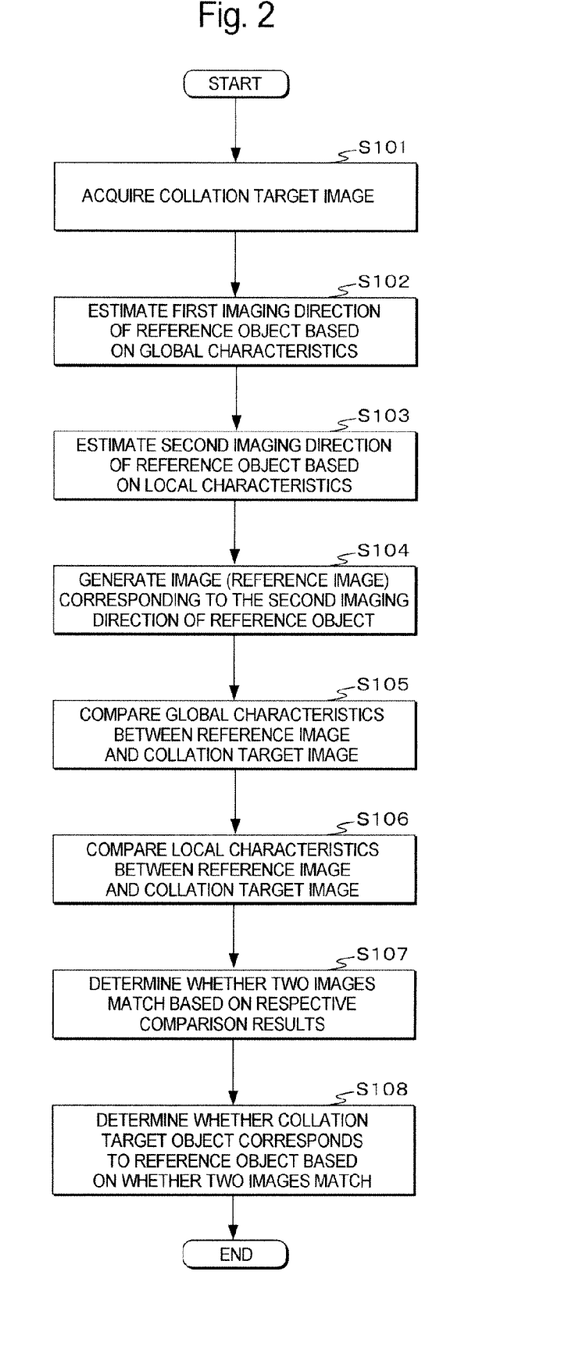
FIG. 2 is a flow chart depicting the image collation processing.
Figure 3:
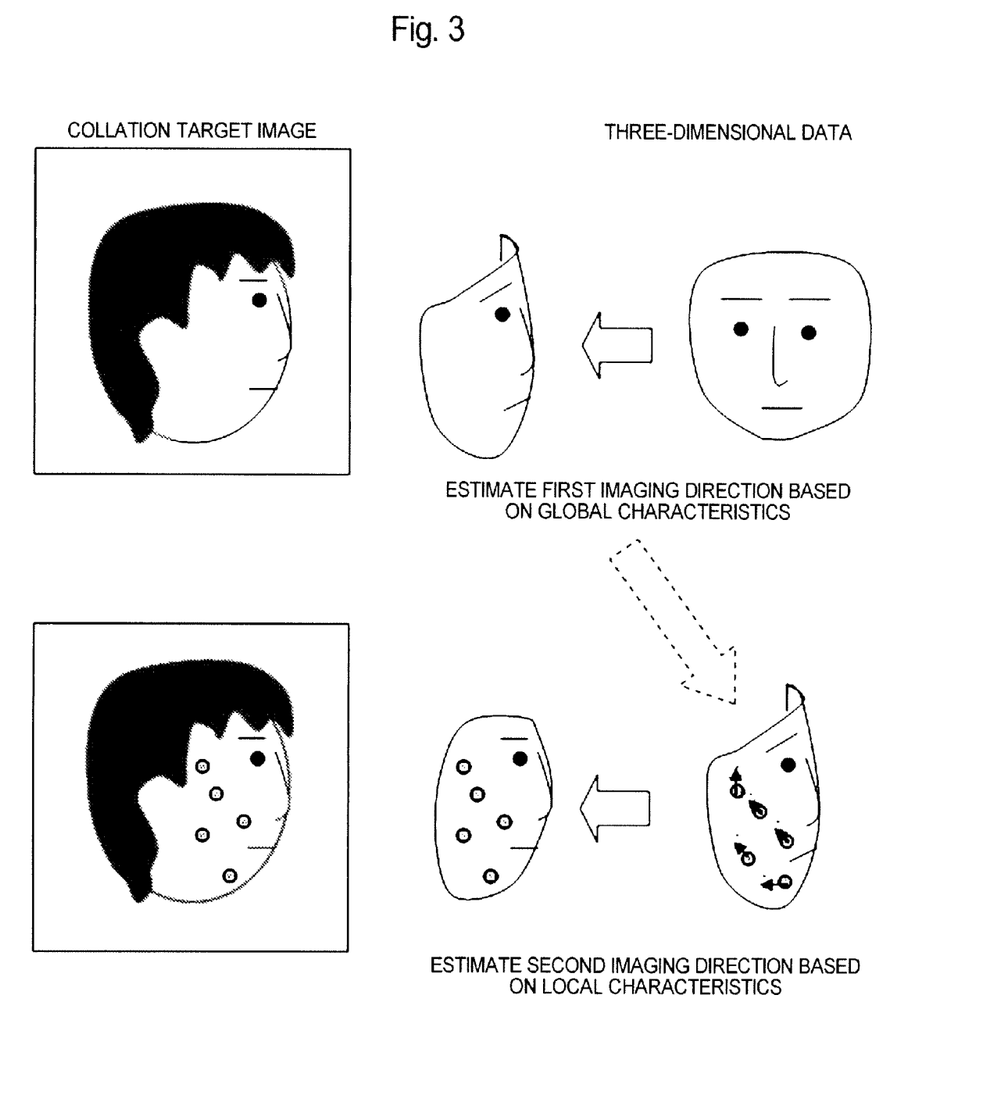
FIG. 3 is a schematic diagram depicting respective estimation methods for the first imaging direction and the second imaging direction of the reference object.

FIG. 2 is a flow chart depicting a flow of the image collation processing by the image collation system 1. FIG. 3 is a schematic diagram depicting the flow of the imaging direction estimation processing of the reference object. The image collation processing will now be described with reference to FIG. 2 and FIG. 3. In the present description, each step (including partial steps not denoted with a reference symbol) in the flow chart can be arbitrarily changed in sequence, or can be executed in parallel in a range where the processing contents are not in contradiction.

When the camera 100 captures an image of a human face, the first direction estimating means 111 of the data processor 104 acquires the image of the face (collation target image) (S101). The image of the collation target object used here can be captured in any imaging direction.

Then the first direction estimating means 111 compares the global characteristics between the collation target image and three-dimensional data representing the shape and texture of a reference object read from the storage device 102, so as to estimate a general imaging direction (first imaging direction) of the reference object that matches the imaging direction of the collation target object, as the upper portion in FIG. 3 illustrates (step S102). The first imaging direction of the reference object can be estimated using the method disclosed in Patent Document 1, for example.

Then the second direction estimating means 113 estimates a more detailed imaging direction (second imaging direction) of the reference object, as the lower portion in FIG. 3 illustrates, using the first imaging direction of the reference object estimated above as the initial value (S103). Specifically an image corresponding to the first imaging direction of the reference object is generated based on the three-dimensional data stored in the storage device 102, and compares the local characteristics between the generated image corresponding to the first image direction and the collation target image, so as to estimate the second imaging direction of the reference object that matches the imaging direction of the collation target object. To determine the second imaging direction of the reference object, a method for determining a most likely correspondence is determined between the reference image (in this case, the image corresponding to the first imaging direction of the reference object) and the collation target image out of the many minor characteristic points observed on the face surface, and determining the imaging direction of the reference object in such a way that the positions and shapes of the corresponding characteristic points match, can be used, for example, as disclosed in Non-patent Document 1. Details on the processing to estimate the second imaging direction of the reference object will be described later with reference to FIG. 4 and FIG. 5.

When the second imaging direction of the reference object is estimated, the image conformity determining means 115 generates an image corresponding to the second imaging direction of the reference object as the reference image, based on the three-dimensional data stored in the storage device 102 (S104), compares the global characteristics (S105), compares the local characteristics (S106) between the generated reference image and the collation target image, determines whether both images match based on the respective comparison result (S107), and determines whether the collation target object corresponds to the reference object based on the above determination result (S108).

In concrete terms, a first similarity between the reference image and the collation target image is calculated by comparing the global characteristics between the reference image and the collation target image. For the image collation method based on the comparison of the global characteristics, the method disclosed in Patent Document 1 can be used.

Then a second similarity between the reference image and the collection target image is calculated by comparing the local characteristics between the reference image and the collation target image. For the second similarity, the collation score disclosed in Non-patent Document 1 can be used.

Then the image conformity determining means 115 determines whether the reference image and the collation target image match based on the respective results of comparing the global characteristics and the local characteristics performed between the reference image and the collation target image, that is based on the first similarity and the second similarity. As a possible method for this determination, a statistical value of the first similarity and the second similarity (e.g. average value, maximum value, minimum value, weighted sum) is compared with a predetermined threshold, and it is determined that these images match if the statistical value is greater than the threshold. Based on whether the collation target image and the reference image match, the image conformity determining means 115 outputs the result of the image collation processing, that is whether the collation target object and the reference object correspond to each other via a monitor or a speaker. For example, if it is determined that these images match, information to notify that the collation target object corresponds to the reference object is output.

Figure 4:
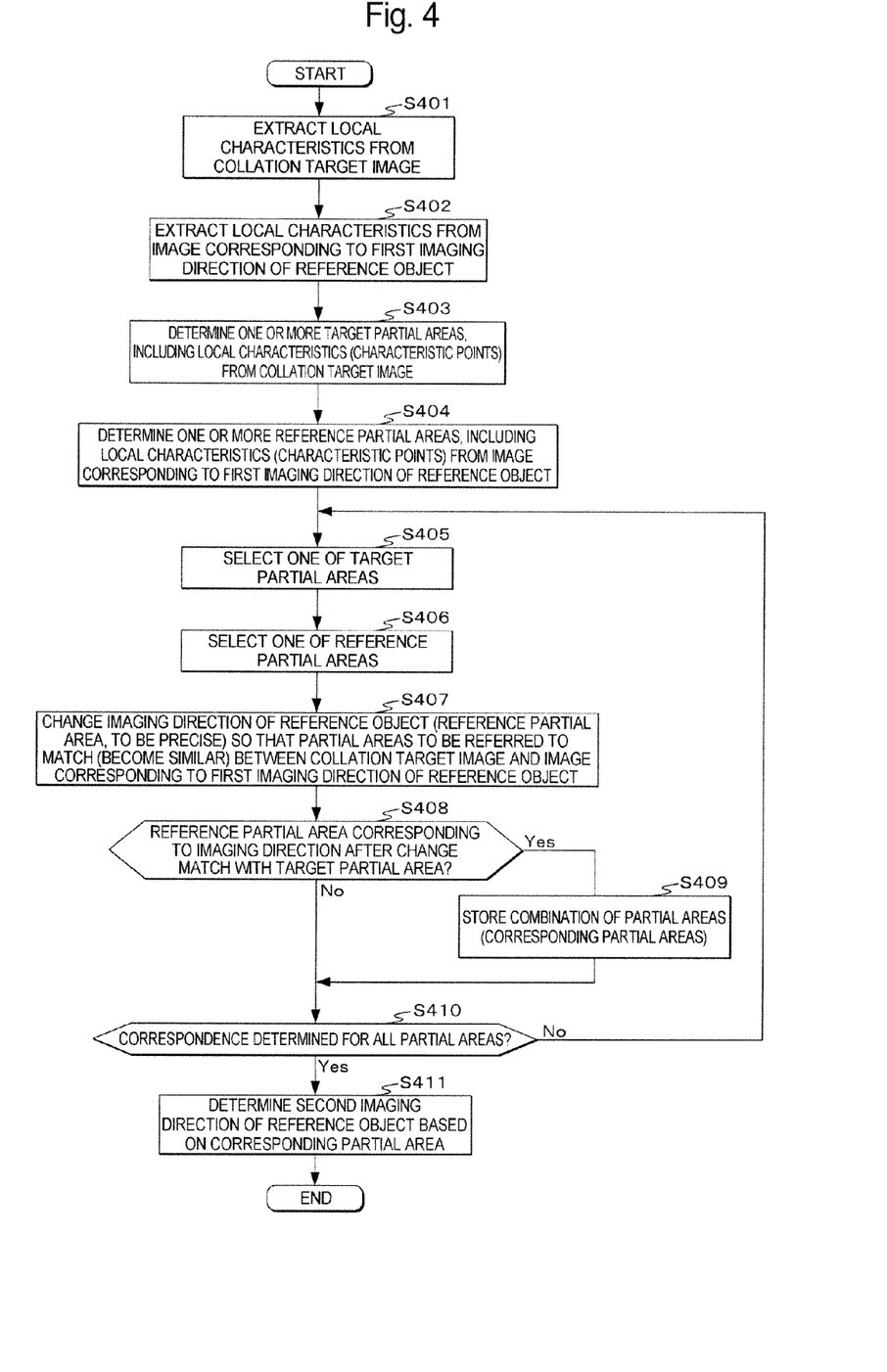
FIG. 4 is a flow chart depicting the second imaging direction estimation processing.
Figure 5:
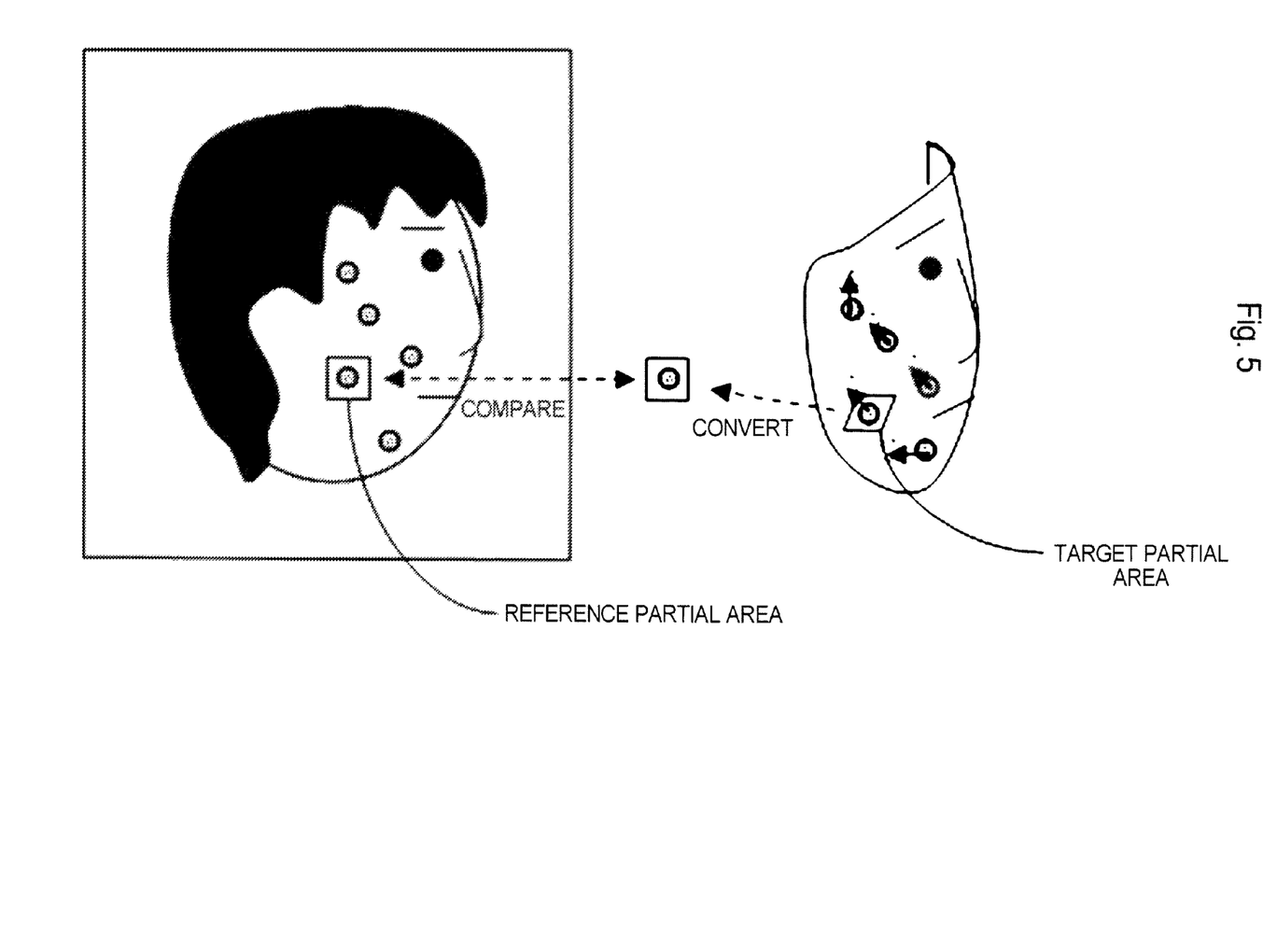
FIG. 5 is a schematic diagram depicting the estimation method for the second imaging direction of the reference object in more detail.

FIG. 4 is a flow chart depicting, in more detail, the second imaging direction estimation processing of the reference object by the second direction estimating means 113 of the data processor 104, and FIG. 5 is a schematic diagram depicting the flow of the second direction estimation processing in more detail. The second imaging direction estimation processing will be described in detail with reference to FIG. 4 and FIG. 5.

First the second estimating means 113 extracts local characteristics respectively from the collation target image and the image corresponding to the first imaging direction of the reference object respectively (S401, S402). For the method of extracting the local characteristics, the method disclosed in Non-patent Document 1 can be used.

Then the second direction estimating means 113 determines one or more partial areas (target partial areas) including local characteristics (characteristic points) in a predetermined range, out of the collation target image (S403). [The second direction estimating means 113] also determines the partial areas (reference partial areas), out of the image in the first imaging directions of the reference object (S404).

Then the second direction estimating means 113 sequentially refers to the target partial areas and the reference partial areas, and determines a combination of a target partial area and a reference partial area which correspond to each other.

First one partial area is selected from the target partial areas and the reference partial areas respectively (S405, S406), and a predetermined transformation processing is performed on the reference partial area (S407).

In concrete terms, the second direction estimating means 113 changes the imaging direction of the reference object (the partial area, to be precise), so that partial areas to be referred to match (become similar) between the collation target image and the reference image (image corresponding to the first imaging direction of the reference object). To be more precise, the second direction estimating means 113 changes the imaging direction for each reference partial area so as to be similar to the maximum to the target partial area respectively.

Then the second direction estimating means 113 determines whether the reference partial area corresponding to the imaging direction after the change matches the target partial area, by comparing the similarity with a predetermined threshold, for example, (S408), and if it is determined that these partial areas match, the combination of these partial areas (corresponding partial area) is stored (S409). By repeating the processing in S405 to S409 for all the partial areas, correspondence (corresponding partial area) is determined for a plurality of partial areas. It is assumed that the second direction estimating means 113 determines a target partial area having the highest similarity as the corresponding partial area for each reference partial area, and if the second direction estimating means 113 detects a combination having a similarity higher than that of the corresponding partial area determined in the corresponding partial area determination processing (S408 and S409) executed before, for example, while repeating the processing in S405 to S409, this combination of the partial areas having the higher similarity is stored as the corresponding partial area (e.g. overwritten).

After repeating the processing in S405 to S409 until correspondence is determined for all the partial areas (YES in S410), the second imaging direction of the reference object is determined based on the corresponding partial area determined in S408 (S411).

In concrete terms, the second imaging direction of the reference object is determined using the three-dimensional data stored in the storage device 102, so that the corresponding partial areas of the collation target image and the reference image overlap best (e.g. so that a number of pixels in the overlapped areas reach the maximum).

As described above, according to the present invention, a general imaging direction (first imaging direction) of the reference object is estimated first based on the global characteristics, then a more precise imaging direction (second imaging direction) of the reference object is estimated based on the local characteristics. Therefore even if the image of the collation target object corresponds to the imaging direction in which observing global characteristics is difficult (e.g. image of a face looking aside), a detailed imaging direction can be estimated based on the observable local characteristics in the entire surface of the collation target object, and image collation can be executed.

In other words, in the case of handling human faces as a collation target object and a reference object, eyes, eyebrows, nose and mouth can be used as global characteristics, and moles, spots, freckles, pores and bumps on the skin can be used as local characteristics. But eyes and mouth are located on the front area of the face, and if the posture is estimated using only the global characteristics, the posture estimation accuracy drops when the face is looking aside. The local characteristics (image characteristics representing patterns on the skin, such as moles), on the other hand, can be detected on the surface of the skin of the entire face, so no matter which imaging direction in which the collation target object (face) is imaged, the imaging direction can be estimated at high accuracy.

Furthermore the general imaging direction (first imaging direction) of the reference object can be estimated based on the global characteristics, hence a range of correspondence candidates based on local characteristics is narrowed, and processing efficiency can be increased.

Furthermore according to the present invention, the imaging direction estimation processing is executed in stages, that is the general imaging direction (first imaging direction) of the reference object is estimated first based on the global characteristics and then a more precise imaging direction (second imaging direction) of the reference object is estimated based on the local characteristics, therefore even if the face images having similar global characteristics are collated respectively, such as a case of twins, conformity of the collation target object and the reference object can be determined more accurately using the difference of local characteristics, such as moles.

The present application claims priority based on Japanese Patent Application No. 2010-3832 filed on Jan. 12, 2010, and all disclosures thereof are incorporated.

Although the present invention has been described with reference to the embodiments, the present invention is not limited to the embodiments. Numerous modifications can be made on configurations and details of the invention by those skilled in the art within the scope of the invention.

The present invention may be applied to a personal authentication system using face image collation, an image retrieval system based on image allocation, and a framework (human interface) for operating a computer based on the direction of a face.

1 image collation system
100 camera
102 storage device
104 data processor
111 first direction estimating means
113 second direction estimating means
115 image conformity determining means

I claim:

1. An image collation system, comprising:
    a three-dimensional data storing unit for storing three-dimensional data on at least a shape and a texture of a reference object;
    a first direction estimating unit for estimating a first imaging direction of the reference object that matches an imaging direction of a collation target object by comparing global characteristics between an image of the collation target object and the three-dimensional data of the reference object stored in the three-dimensional data storing unit;
    a second direction estimating unit for generating an image corresponding to the first imaging direction of the reference object based on the three-dimensional data, and estimating a second imaging direction of the reference object that matches the imaging direction of the collation target object by comparing local characteristics between the image of the collation target object and the generated image corresponding to the first imaging direction; and
    an image conformity determining unit for generating an image corresponding to the second imaging direction of the reference object based on the three-dimensional data, and determining whether the collation target object corresponds to the reference object based on whether the image of the collation target object matches the generated image corresponding to the second imaging direction.

2. The image collation system according to claim 1, wherein
    the second direction estimating unit extracts corresponding partial areas in the image of the collation target object and the image corresponding to the first imaging direction of the reference object, and determines the second imaging direction of the reference object so that the extracted corresponding partial areas overlap with each other.

3. The image collation system according to claim 2, wherein
    the second direction estimating unit changes the imaging direction for each partial area of the image corresponding to the first imaging direction of the reference object, so that the partial area becomes most similar to each partial area of the image of the collation target object, and determines the partial area of the image of the collation target object of which similarity is highest, as the corresponding partial area.

4. The image collation system according to claim 3, wherein
    the image conformity determining unit determines whether the image corresponding to the second imaging direction of the reference object matches the image of the collation target object, based on the result of comparing the global characteristics and local characteristics respectively between these images.

5. The image collation system according to claim 3, wherein
    the collation target object and the reference object comprise human faces, and the local characteristics comprise image characteristics based on at least one of: moles, spots, freckles, pores and bumps on the skin of the face.

6. The image collation system according to claim 2, wherein
the image conformity determining unit determines whether the image corresponding to the second imaging direction of the reference object matches the image of the collation target object, based on the result of comparing the global characteristics and local characteristics respectively between these images.

7. The image collation system according to claim 2, wherein
the collation target object and the reference object comprise human faces, and the local characteristics comprise image characteristics based on at least one of: moles, spots, freckles, pores and bumps on the skin of the face.

8. The image collation system according to claim 1, wherein
the image conformity determining unit determines whether the image corresponding to the second imaging direction of the reference object matches the image of the collation target object, based on the result of comparing the global characteristics and local characteristics respectively between these images.

9. The image collation system according to claim 8, wherein
the collation target object and the reference object comprise human faces, and the local characteristics comprise image characteristics based on at least one of: moles, spots, freckles, pores and bumps on the skin of the face.

10. The image collation system according to claim 1, wherein
the collation target object and the reference object comprise human faces, and the local characteristics comprise image characteristics based on at least one of: moles, spots, freckles, pores and bumps on the skin of the face.

11. An image collation method comprising:

a first direction estimating of estimating a first imaging direction of a reference object that matches an imaging direction of a collation target object by comparing global characteristics between an image of the collation target object and three-dimensional data on at least a shape and a texture of the reference object stored in three-dimensional data storing means;

a second direction estimating of generating an image corresponding to the first imaging direction of the reference object based on the three-dimensional data and estimating a second imaging direction of the reference object that matches the imaging direction of the collation target object by comparing local characteristics between the image of the collation target object and the generated image corresponding to the first imaging direction; and an image conformity determining of generating an image corresponding to the second imaging direction of the reference object based on the three-dimensional data, and determining whether the collation target object corresponds to the reference object based on whether the image of the collation target object matches the generated image corresponding to the second imaging direction.

12. A computer program stored on a non-transitory computer readable medium for causing a computer to execute the image collation method according to claim 11.

* * * * *